Figure 1:
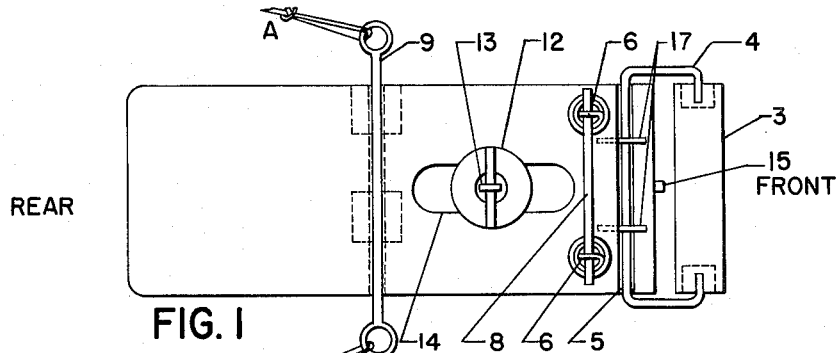

March 27, 1962     J. E. WEAVER     3,026,646
LINE HOLDING CLAMP DEVICE
Filed Oct. 31, 1960

INVENTOR.
BY *John E. Weaver*

United States Patent Office 3,026,646
Patented Mar. 27, 1962

3,026,646
LINE HOLDING CLAMP DEVICE
John E. Weaver, P.O. Box 855, Marathon, Fla.
Filed Oct. 31, 1960, Ser. No. 66,132
5 Claims. (Cl. 43—43.12)

This invention relates to a line holding clamp device, and in particular to a line holding clamp device for the purpose of holding a trolling line as used in sport fishing. The word "line" used in this subject matter is intended to mean a fishing line, string, cord, rope or similar cordage whether used for fishing or for any other purpose. The present invention is a continuation-in-part of the invention disclosed in my patent application Serial No. 3,198, filed January 18, 1960, entitled Line Holding Clamp Device, which application has since become abandoned.

An object of this invention is to provide a clamp for holding a line in such a manner that the line will be released instantly when the line is pulled or jerked as when a fish takes or strikes the bait on said line or strikes any part of said line or its attachments or as when said line is withdrawn from said clamp by force from any cause.

A further object of this invention is to provide a clamp for holding a line which clamp will be adjustable in a manner so that it will release the line under varying amounts of pull on the line, depending on the way the clamp is adjusted.

A further object of this invention is to provide a clamp for holding a line which clamp will emit a plainly audible sound when the line is withdrawn from the clamp thus warning the persons concerned that the line has been withdrawn.

A further object of this invention is to provide a clamp for holding a line which can be easily and quickly adjusted and clamped to the line in a manner that will insure a uniform release of said line each time it is withdrawn.

A further object of the invention is to provide a clamp for holding a line which has provision for attaching to it lines which support it in place while it is in use.

Other objects and advantages will be apparent from the drawings and detail description which follows.

Referring to the drawings:

FIGURE 1 is a top elevation view with all parts assembled. Also in this figure are shown lines to hold this device while it is in use. These lines (A) and (B) are not a part of this invention.

Figure 2:
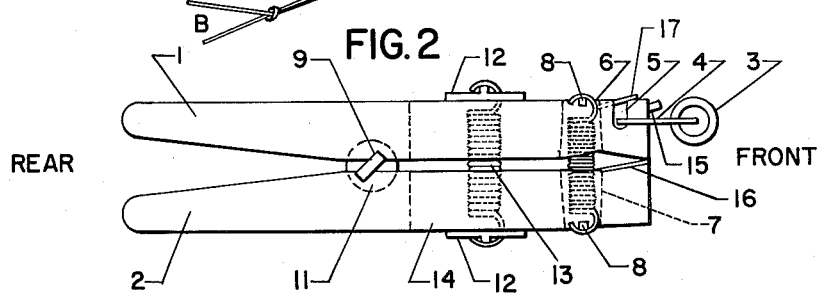

FIGURE 2 is a side elevation view with all parts assembled, as viewed while not in use.

Figure 3:
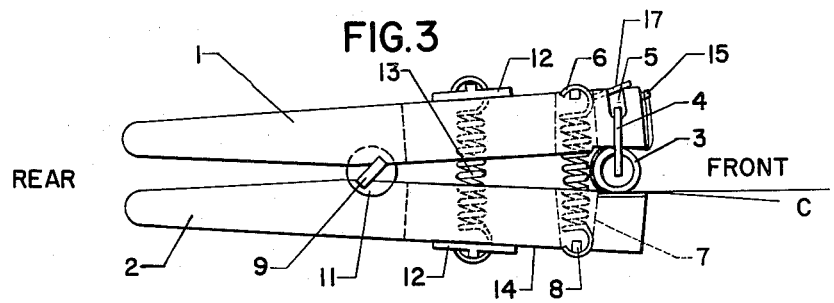

FIGURE 3 is a side elevation view showing all parts assembled and with loop of the line (c) to be held clamped between the jaw 1 and jaw 2 and the roller 3. The loop of line (c) is not a part of this invention.

Figure 4:
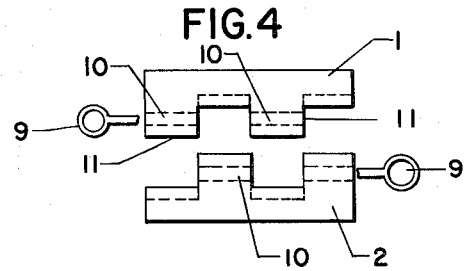

FIGURE 4 is an end elevation view showing in exploded relation, the clamping jaws and their connecting means.

Referring to FIGURES 1 to 4 of the drawings the reference numbers 1 and 2 designate the two clamping jaws of this device. The reference number 3 designates a roller with a recessed opening in each end. The reference number 4 designates a bail mounted in jaw 1.

The reference number 6 designates each of two coiled springs which are held in expansion in openings 7 in each jaw 1 and 2.

The reference number 7 FIGURE 2 designates the openings in jaws 1 and 2 which house the coil springs 6.

The reference number 8 in FIGURE 1 and FIGURE 2 and FIGURE 3 designate each of two pins, one in jaw 1 and one in jaw 2. The pins 8 hold the springs 6 in suspension in openings 7.

The reference number 9 in the drawings designate a wire rod with a closed loop or eye in each end. The reference number 10 in FIGURE 4 designates holes in jaws 1 and 2 which receive rod 9 when assembled.

The reference number 12 in the drawings designates a round plate of slide member having holes suitable to receive the ends of spring number 13 when assembled.

The reference number 13 in FIGURE 1 and FIGURE 2 and FIGURE 3 designates a spring suspended in jaws 1 and 2 by the plates number 12.

The reference number 14 in FIGURES 1 and 2 and 3 designates the elongated opening in jaws 1 and 2 which houses the coil spring number 13.

The reference number 15 in FIGURES 1 and 2 and 3 designates a pin shaped projection of the front end of jaw number 1.

The reference number 16 in FIGURES 1 and 2 and 3 designates the sloping face of the clamping surface of jaws 1 and 2.

The reference number 17 in FIGURES 1 and 2 and 3 designates a pair of pins that retain bail 4 in slot 5.

Referring to the drawings, the line holding clamp consists of a pair of jaws 1 and 2 which are approximately one half as wide as they are long and one fifth as thick as they are wide, their size to be governed by their use. Essentially flat on one side, their thickness is slightly tapered from the pivot rod 9 to the rear end of said jaws.

The face of the clamping surface of each jaw as designated by the reference number 16 is at an angle to the top and bottom side of the jaw.

Jaw number 1 has near the front end a slot number 5 which carries the bail 4 which in turn carries the roller 3.

In FIGURE 2 are shown the coil springs 6 in a side view, showing the manner of suspension by means of the pins 8. Also in FIGURES 2 and 3 are shown the drum shaped bosses 11 on the bottom side of each jaw 1 and 2. These bosses are shaped like one half of a drum, bisected lengthwise, and are so disposed as to enter a matching formed recess in the opposite jaw 1 or 2 when the two are assembled, and thus forming a pivoted attachment of the jaw 1 to the jaw 2.

A further view of these bosses is shown in FIGURE 4. Each of these bosses 11 also has a hole 10 so disposed to the others that when assembled they form a continuous hole to receive the rod 9.

*Mode of Operation*

In use, the line clamp of this invention may be operated as follows. The device can be suspended in operation by attaching lines (A) and (B) FIGURE 1 to the eyes of rod 9 FIGURE 1 or clamped or attached to any other support in such a manner that either jaw of said line clamp may move freely in relation to the other jaw. These lines (A) and (B) are not a part of this invention. The line to be clamped in this device may be so clamped as follows. By pressing the two rear ends of jaws 1 and 2 FIGURE 2 toward each other the front ends of jaws 1 and 2 will separate allowing the roller 3 on bail 4 to be swung into position between the front end of jaws 1 and 2. A loop of the line to be clamped shown as (c) FIGURE 3 can now be inserted between the roller 3 and the jaw 2 as in FIGURE 3, and now by releasing the pressure on the rear ends of jaws 1 and 2 the loop of line (c) will be held between roller 3 and jaw 2 or by a second method as follows. With the bail 4 and roller 3 positioned as shown in FIGURE 2 the line may be looped over the pin 15 with both legs of this loop extending across the front ends of jaws 1 and 2, and by now pressing the rear ends of jaws 1 and 2 toward each other the front ends of said jaws will separate and permit the roller 3 to be moved to a position between the front ends of jaws 1 and 2 and carrying with it a section of the loop of line (c). The device is now in the position as shown in FIGURE 3 and the clamp is now conditioned for use. Line (c) FIGURE 3 is not a part of this invention.

The action of the clamp is described as follows. As the line which is clamped in this device is withdrawn from the jaws 1 and 2 it will carry with it the roller 3. As soon as the roller 3 has been withdrawn from between jaws 1 and 2 the springs 6 and 13 will cause jaws 1 and 2 to take the position shown in FIGURE 2. Normally and properly this coming together of the front end of jaws 1 and 2 will create a distinct sound audible to the operator of the device and in this way make known to the operator that the line (c) FIGURE 3 has been withdrawn from the clamp. The amount of line pull under which the clamp will release can be varied by sliding the plates or slide members 12 together with the springs 13 in adjusted position along the elongated openings 14.

What is claimed is:

1. A line holding clamp device comprising, in combination, a pair of flat, elongated jaw members having substantially flat face portions, pivoting means transversely arranged between said face portions of said jaw members near one end thereof operative to permit rocking of the corresponding longitudinal ends of said jaw members, a bail pivotally attached at the other end of one of said jaw members, a roller rotatably mounted on said bail, said bail being operative to swing said roller about said other end of said one of said jaw members and between the other ends of said jaw members, and resilient means located between said other ends of said jaw members and said pivoting means for urging said other ends of said jaw members in the direction of abutting engagement with each other, whereby a loop of line placed between the other of said jaw members and said roller when said roller is swung between said other ends of said jaw members will be releasably held against said other of said jaw members.

2. A line holding clamp device as defined in claim 1 wherein said roller is cylindrical in shape and wherein inner surface portions of said other ends of said jaw members are formed with beveled recesses increasing in depth from the outside inwardly to provide seating surfaces for said roller.

3. A line holding clamp as defined in claim 2 including a projection extending outwardly of said other end of said one of said jaw members for hookingly receiving a loop of line to be clamped between said jaws and behind said roller.

4. A line holding clamp device as defined in claim 1 wherein said resilient means comprises a coil spring extending through openings in each of said jaw members, and means for holding the ends of said coil spring in tension and in fixed relation with respect to one each of said jaw members.

5. A line holding clamp device as defined in claim 1 wherein said resilient means comprises a coil spring extending through registering elongated openings in each of said jaw members, said openings extending in the direction from end to end between said jaw members, a slide member disposed against the outer surface of each of said jaw members, and means connecting the ends of said coil spring to each of said slide members, said spring being constrained in tension between said jaw members.

References Cited in the file of this patent

UNITED STATES PATENTS

| | | |
|---|---|---|
| 187,456 | Chambers et al. | Feb. 20, 1877 |
| 1,275,582 | Mascellino | Aug. 13, 1918 |
| 1,409,557 | Ray et al. | Mar. 14, 1922 |
| 2,170,594 | Nicholson | Aug. 22, 1939 |
| 2,536,202 | Meyer | Jan. 2, 1951 |
| 2,971,236 | Baker | Feb. 14, 1961 |